Oct. 18, 1960
F. TYLER ET AL
2,956,494
APPLICATION OF LIQUID TO SURFACES
Filed Jan. 8, 1957
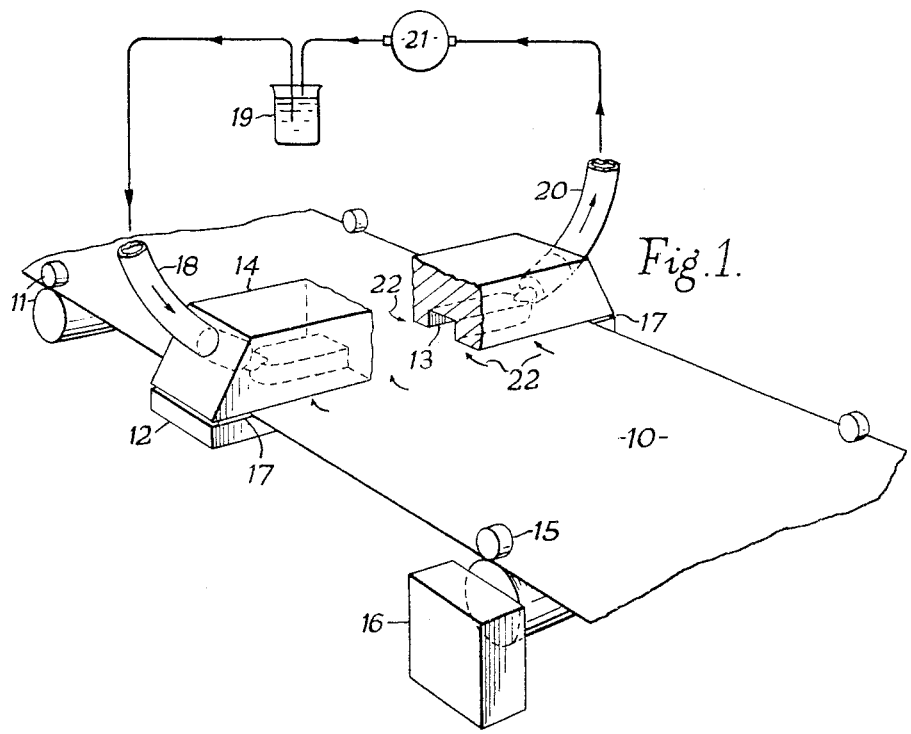
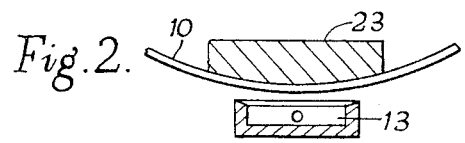
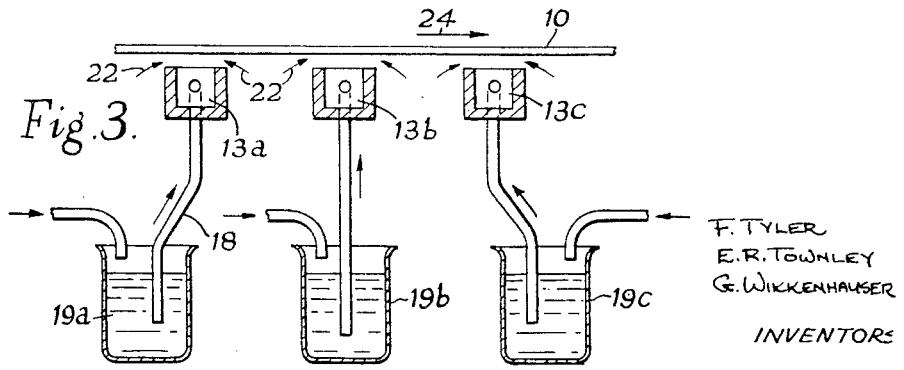
F. TYLER
E. R. TOWNLEY
G. WIKKENHAUSER
INVENTORS
BY Moow & Hall
ATTORNEYS

United States Patent Office 2,956,494
Patented Oct. 18, 1960

2,956,494

APPLICATION OF LIQUID TO SURFACES

Frank Tyler, Eustace Raymond Townley, and Gustav Wikkenhauser, Barkingside, England, assignors to Kelvin & Hughes Limited, Glasgow, Scotland Filed Jan. 8, 1957, Ser. No. 632,996

Claims priority, application Great Britain Jan. 13, 1956

11 Claims. (Cl. 95—94)

The present invention relates to the application of liquid to surfaces, such for example as surfaces of continuously-moving bands. It is concerned particularly, although not exclusively, with the rapid processing of photographic film.

In the rapid processing of photographic film, it has been proposed heretofore to feed a strip of exposed film to a processing head having a recess or shallow cup to which processing fluids are delivered in sequence. The film is fed over the mouth of the shallow cup in such a manner that the processing fluids contact the emulsion side of the film. The shallow cup may be made in various geometrical forms, depending upon the type of film to be processed, but in any case it has an inlet port for the processing fluids and also an outlet port through which the spent fluids are discharged by suction. One difficulty met with in such apparatus is that the film tends to be drawn into the cup by the suction and this may interfere with the flow of processing liquid through the cup.

A means of overcoming this difficulty in apparatus in which the film is moved intermittently over the cup has been proposed in which a plain flat member is provided upon the base side of the film (the side opposite to the emulsion) opposite the cup in the processing head. This member is capable of operating as a suction device on the base side of film and it may take the form of a perforated plate or a block of porous material. A suction pipe communicating with this block creates a partial vacuum maintaining lower pressure than that in the processing cup. In this way the base side of the film over the central area thereof is drawn against the block and the tendency of the suction and the emulsion side of the film to draw the film into the processing recess is counteracted.

The last-named apparatus is, however, not suitable for the processing of a continuously moving band. This is because it is arranged that the film is drawn by the suction within the cup against the edges of this cup in order to provide a seal which prevents liquid escaping from the cup and also to enable the processing liquid to be drawn by suction from a tank into the recess. If, therefore, at any time during processing, the film were to be moved while in contact with the edges of the processing cup, the film would be liable to tear or slight irregularities in the edge of the cup might cause scratching of the film emulsion which is highly undesirable.

It is an object of the present invention to provide improved film-processing apparatus in which there is no danger of spilling or leakage of the processing liquid from the processing head and in which there is no interference with the flow of the processing liquid through the processing cup.

It is a further object of this invention to provide film-processing apparatus in which the risk of damage to the material being processed by scratching or by other means is avoided.

According to this invention there is provided apparatus for the application of liquid to the surface of a material comprising a processing head having a cup or recess provided with an inlet and an outlet opening for processing liquid, means for maintaining the material spaced at a short distance from the edges of the cup or recess, a reservoir for processing liquid, and means for applying suction to the recess, the arrangement being such that liquid in the reservoir can be delivered to the cup or recess while air is drawn into the cup or recess through the space between the cup or recess and the said material.

The invention will be described by way of example with reference to the accompanying diagrammatic drawing in which—

Fig. 1 is a part sectional perspective view illustrating one embodiment of the invention, and Figs. 2 and 3 are part sectional views of parts of two other embodiments of the invention.

In the embodiment of Fig. 1 which is suitable for the rapid processing of photographic film, the film 10 is run between a pair of tensioning rollers 11, over a support 12 beneath the mouth of a shallow cup 13 in a processing head 14 and then between a pair of pulling rollers 15 one or both of which is driven, for example, by a suitably geared motor 16, the emulsion side of the film facing the cup, that is being uppermost in the figure. The film 10 is thus moved at a constant speed. The arrangement is such that the tension applied to the film 10, maintains it in contact with the support 12 and spaced by means of spacers 17 a short distance from the rim of the cup 13. The cup is provided with an inlet pipe 18 having its end beneath the surface of processing liquid in a reservoir 19 open to the air. The cup also has an outlet pipe 20 connected to the suction side of a vacuum pump 21, the pump discharging into the reservoir 19.

In operation, the action of the pump 21 is to draw liquid from the reservoir 19 into the cup 13 and at the same time to draw air into the cup through the gap between the film and the rim of the cup as indicated by arrows 22. The inflow of air substantially prevents escape of liquid from the cup: in fact, the cup may be disposed on its side or even inverted as shown in Fig. 1 without substantial loss of liquid.

The air contained in the liquid fed to the reservoir by the pump 21 escapes from the reservoir 19 which, as stated, is open to the air.

It will be seen, therefore, that both the processing operation and the flow of processing liquid in the pipe line between the suction and of the processing head 14 and the reservoir 19 containing the processing liquid are continuous. The processing liquid is sucked into the processing head and additional air is sucked into the system through the gap. In the pipe line between the processing head and the pump and in the pipe line leading from the pump to the vessel containing the processing liquid there is a mixture of air and processing liquid. Since the top of the reservoir is open to the atmosphere the processing liquid is substantially air-free when it is supplied to the pipe connected to the inlet of the processing head. It is, of course, not essential that the processing liquid should be returned to the vessel from which it is drawn: it may be returned to a different vessel or to waste. The film 10 may be held at a suitable spacing from the head 14 by tension alone, the support 12 being omitted.

In one example of apparatus of the kind shown in Fig. 1 for processing 35 mm. film the cup or recess 13 has a width of 2 mm. measured along the length of the film 10, a length of 20 mm. in a direction transverse of the film, and a depth of about 4 mm. In another apparatus for processing paper six inches wide, the slot has a width of ¼ inch, a length of 5½ inches, and a depth of ⅜ inch.

Other means than that described may be used to hold the film at the required short distance from the rim of the cup. For instance as shown in Fig. 2 a member 23 having a convexly curved guide surface may be provided over which the film 10 is drawn.

If it is necessary to use several processing liquids, it may be advisable to provide separate processing heads placed in sequence along the moving band of material to be processed and so arranged that each station uses and circulates one liquid only. Thus as shown in Fig. 3, a film 10 is moved in the direction of the arrow 24 over three cups 13a, 13b and 13c each associated with a separate reservoir 19a, 19b and 19c respectively and a separate pump which is not shown in this figure. The three reservoirs may for instance contain developer, fixer and water respectively. In some photographic processes it may be desirable to use a specially prepared photographic developer/fixer monobath.

The gap between the film 10 and the mouth or mouths of the cups in Figs. 2 and 3 has been exaggerated for the sake of clearness in the drawing. The showing of the gap is greater than would be used in practice. In the actual device the gap is made such that the film makes contact with the meniscus of the liquid in the cup. The effect of drawing air (as indicated for example by the arrow 22 in Fig. 3) into the gap between the cup and the film is to create an air cushion which constitutes an effective extension of the side walls of the cup.

Owing to the gap between the film and the processing head any risk of scratching of the film emulsion by contact with the head is avoided. Troubles due to corrosion are also avoided, as there are no valve gears or movable metal parts, springs, etc. in the liquid circuit.

Another advantage in drawing a thin layer of air into the processing head lies in the aid this gives to the evaporation of water from the processed gelatine of the photographic strip material thereby producing rapid drying. The air layer is also essential in obtaining turbulent flow in the processing head and it is this turbulent flow which ensures effective processing.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. Apparatus for the application of liquid to the surface of a material comprising a processing head, a recessed surface on said head, an inlet for supplying liquid to said recess, an outlet means leading from the recessed surface of the processing head for withdrawing liquid from said recess, means for maintaining said material spaced from said surface a distance such that said material contacts liquid in said recess and sufficient outside air is admitted through the space provided by said means to produce turbulence of said liquid and to prevent any substantial flow of liquid through said space, a reservoir for said liquid, means coupling said reservoir to said inlet, and suction-producing means coupled to said outlet whereby liquid is withdrawn from said recess together with air entering the space between said surface and said material to produce turbulent flow of said liquid over the surface of said material.

2. Apparatus for the application of liquid to the surface of a material comprising a processing head, said head having a recess, an inlet and an outlet leading from said recess for the supply and withdrawal of liquid to and from said recess, means for maintaining said surface spaced from said processing head, a reservoir for said liquid, means coupling said reservoir to said inlet, and suction producing means coupled to said outlet, whereby liquid is withdrawn from said recess together with air entering the recess from outside the processing head through the space between said surface and said head.

3. Apparatus according to claim 2 including means for moving said material over said head at a substantially constant speed. Support means for said material, said means for maintaining said material spaced from said surface comprising means positioning said recessed surface of said processing head removed from said material a sufficient distance to permit the passage of air.

4. Apparatus according to claim 1 comprising a liquid coupling between said outlet and said reservoir.

5. Apparatus according to claim 4 wherein said reservoir is open to the atmosphere whereby air mixed with said liquid can escape.

6. Apparatus according to claim 2, wherein said means for maintaining said surface spaced from said processing head comprise means applying tension to said material.

7. Apparatus according to claim 6, wherein said means for maintaining said surface spaced from said processing head comprise a supporting member having a supporting surface positioned to engage the surface of said material opposite to that facing said recess and to have said material drawn thereagainst by said tensioning means.

8. Apparatus according to claim 7, wherein said supporting surface is convexly curved.

9. In combination in apparatus for the rapid processing of photographic film, a processing head, said head having a recess, an inlet and an outlet leading from said recess for the supply and withdrawal of film processing material to and from said recess, means for maintaining at lease portions of film being processed spaced from said head, means to supply processing material to said inlet and withdraw said material through said outlet and means to entrain ambient air with said material to produce turbulent flow within said recess and in contact with a film being processed to insure effective processing.

10. The combination set forth in claim 9, said material comprising a developing liquid, said means for maintaining at least portions of film being processed in spaced relation with respect to said head comprising a supporting member providing a space between said film and said head for the admission of said ambient air.

11. Apparatus according to claim 2 comprising means for moving said material over said head at a substantially constant speed.

References Cited in the file of this patent

UNITED STATES PATENTS

| | | |
|---|---|---|
| 2,548,573 | Wampole et al. | Apr. 10, 1951 |
| 2,595,430 | Tuttle et al. | May 6, 1952 |
| 2,688,278 | Tuttle | Sept. 7, 1954 |
| 2,780,974 | Fairbank | Feb. 12, 1957 |